United States Patent
Winslow

[15] 3,659,746
[45] May 2, 1972

[54] SEED PLANTER

[72] Inventor: James C. Winslow, 599 Elm Street, Sierra Madre, Calif. 91024

[22] Filed: Feb. 9, 1970

[21] Appl. No.: 9,824

[52] U.S. Cl. ..................... 221/185, 111/78, 221/265, 222/177, 222/220
[51] Int. Cl. ........................................................ A01c 7/04
[58] Field of Search ............ 111/77, 78; 221/185, 261, 265; 222/177, 220

[56] References Cited

UNITED STATES PATENTS

| | | |
|---|---|---|
| 3,087,444 | 4/1963 | Ferguson .......................... 111/78 X |
| 835,040 | 11/1906 | Snyder ............................... 221/265 |
| 3,347,426 | 10/1967 | Morrison .......................... 222/177 X |
| 3,308,774 | 3/1967 | Keeton .............................. 221/265 X |
| 3,348,504 | 10/1967 | Fisher ............................... 111/77 X |

Primary Examiner—Robert B. Reeves
Assistant Examiner—Thomas E. Kocovsky
Attorney—Forrest J. Lilly

[57] ABSTRACT

A seed planter for planting seeds in a row at uniform spacing. A rotating seed carrier and ejector ring is provided and has in its interior cylindric surface slots which fill with seed supplied thereto, and which have filler portions and ejection portions laterally offset to intersect a groove cut into the inner surface of the ring. The ejection portions of the slots have open bottoms. As the ring rotates, the seeds in the ejection portions are intercepted by an ejector finger which knocks them out the open bottoms of the slots and through apertures leading them to a distribution wheel which drops them at spaced intervals. A flexible vibratory diaphragm is provided to maintain the seed in free motion, and has an aperture for passing the seeds directly onto the lower portion of the rim of the slotted filler and ejector rim, such that they do not pile too high thereon.

10 Claims, 11 Drawing Figures

Patented May 2, 1972
3,659,746
3 Sheets-Sheet 1
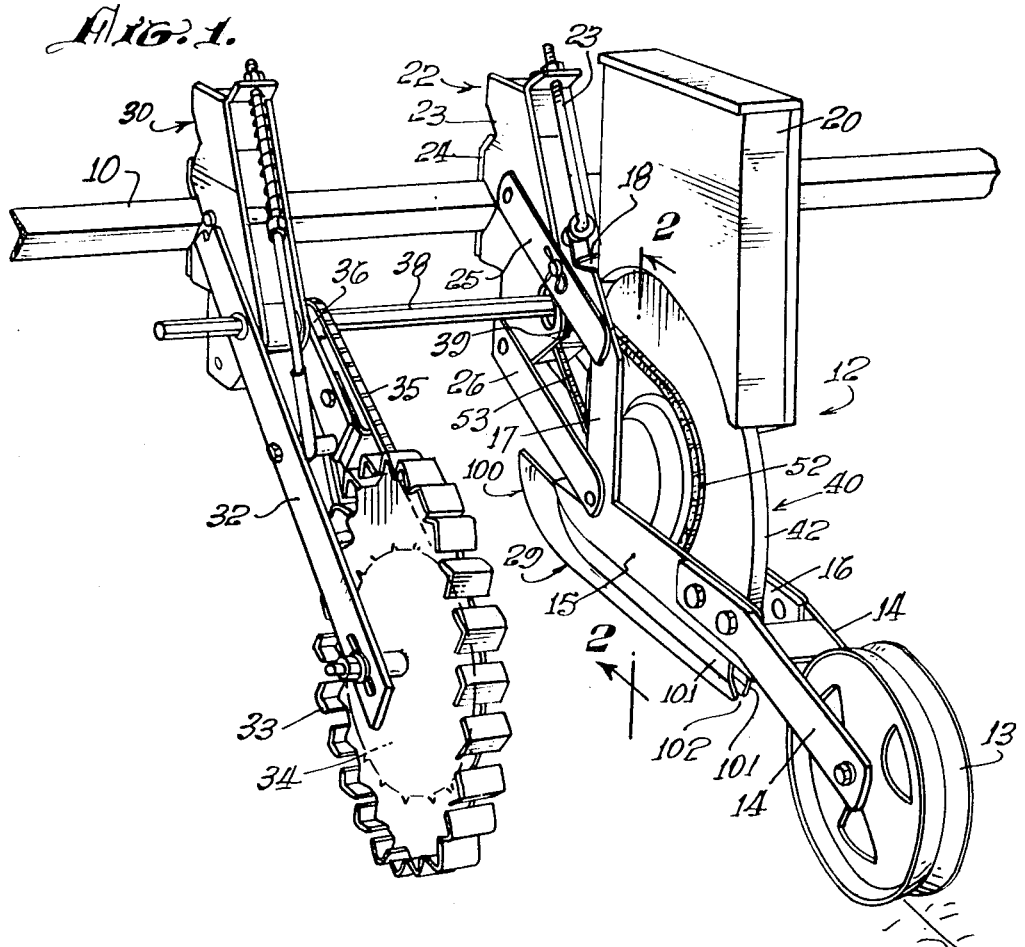
FIG. 1.
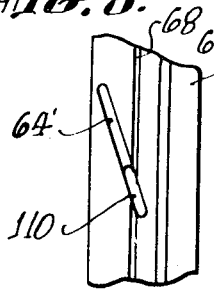
FIG. 8.
FIG. 9.
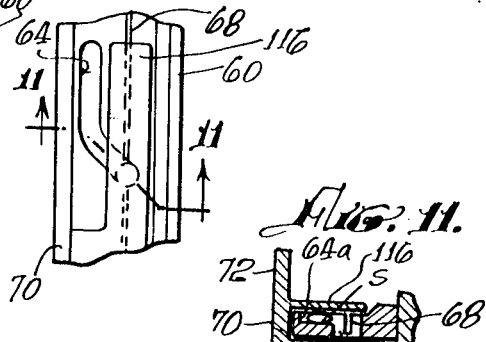
FIG. 10.
FIG. 11.
INVENTOR
JAMES C. WINSLOW,
By
Attorney.

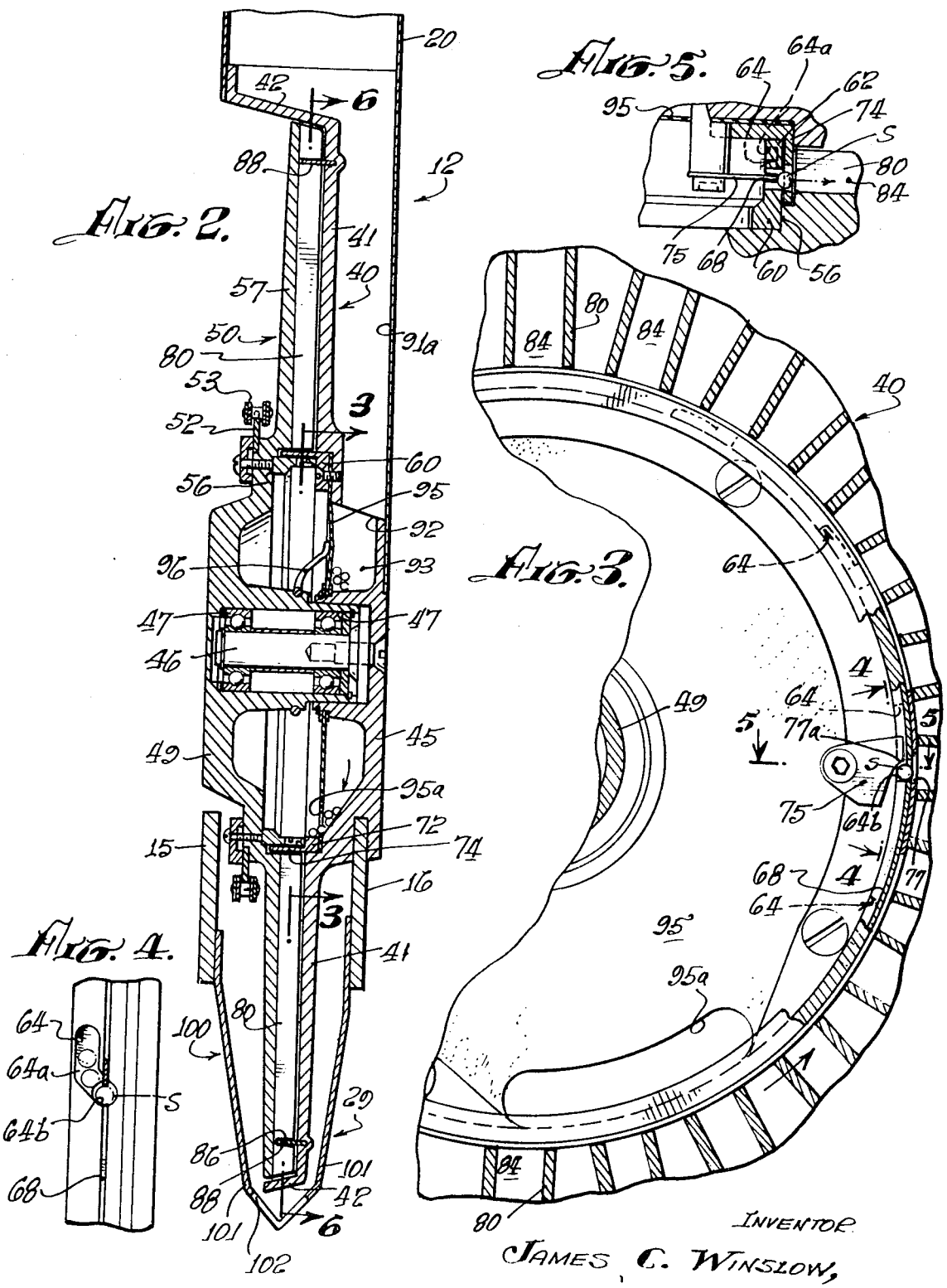

Patented May 2, 1972

INVENTOR.
JAMES C. WINSLOW,

By *[signature]*

ATTORNEY.

3,659,746

1
SEED PLANTER

FIELD OF THE INVENTION

This invention relates generally to certain new and useful improvements in seed planters, particularly of the type mounted on wheels and towed over the area to be planted by a tractor. The invention concerns planters characterized further by the use of a rotating planter wheel utilizing a multiplicity of radially extending seed channels, with means for introducing single seeds periodically into the inner ends of successive channels, the outer ends of which periodically eject the seeds by centrifugal force.

BACKGROUND OF THE INVENTION

The seed planter of the invention is in many respects similar to and an improvement upon a seed planter disclosed in prior U.S. Pat. No. 2,783,918 issued Mar. 5, 1957 to John J. Bramblett. The planting machine disclosed in this prior patent was specifically designed for the periodic planting of groups of several seeds at equally spaced intervals along a crop row. The present invention is directed to the provision of a somewhat similarly organized machine, but equipped with means for positively and accurately depositing a single seed at a time at regularly spaced intervals along the crop row. Additional purposes of the invention are the provision of improvements by which the flow of seeds through the machine and the accurate planting of the seeds, one at a time, without "misses," as well as without breaking of individual seeds, is positively assured. A further and most important purpose is the provision of a seed planter of the type indicated capable of being towed over the ground at relatively high speed as, say, 10 miles per hour, while maintaining its positiveness and surety of action.

BRIEF SUMMARY OF THE INVENTION

The invention provides a rotating seed ring, characterized by a peripheral flange or rim, over or inside of which a quantity of seeds is maintained. The inner periphery of this flange is formed with circumferentially spaced slots or pockets which underlie these seeds, wherein a number of seeds from above will inevitably collect at the bottom. These seed slots or pockets are formed in a circular row at uniform spacing around the interior of the seed ring flange, and excepting for laterally offset portions to be described immediately, do not penetrate entirely through the seed ring flange. Portions of these slots or pockets, at the front ends thereof in the direction of rotation of the ring, extend or are offset laterally of the seed ring to intercept an internal circumferential groove formed in the interior of the seed ring, and these intercepting portions of the slots are formed in the bottom thereof to penetrate entirely through the rim. An ejector blade or finger stationarily mounted inside the seed ring, projects into this circumferential groove and is engaged by seeds received in the said offset portions of the seed slots or pockets. The seeds so engaged are kicked radially outward, so as to pass through the aperture or open bottom of the offset part of the slot, and thence outward through a seed injection hole generally aligned with the ejector blade and formed in a stationary guard ring which lies just outside the rotating seed ring. In the present illustrative embodiment of the invention, the seed then goes into the radially inner end of a then aligned radial channel of a seed distribution wheel turning with the seed ring. The outer end of this radial channel is exposed for final discharge of the seed into the seed row at a subsequent time when it is pointed generally downwardly. Additional features of the invention include a means for vibrating or stirring the seeds to keep them in motion in passage through the machine, so as to avoid "bridging" or hang-up, as well as provisions for assuring passage of the individual seeds of elongate shape through the slots in the seed ring, all as will be described, together with additional features, in the ensuing description of a preferred illustrative embodiment of the invention.

2
DESCRIPTION OF THE DRAWINGS

In the drawings,

FIG. 1 is a perspective view showing the seed planter of the invention hitched to the tow bar of a towing tractor, not shown;

FIG. 2 is a section taken on line 2—2 of FIG. 1;

FIG. 3 is a section taken on line 3—3 of FIG. 2;

FIG. 4 is a section taken on line 4—4 of FIG. 3;

FIG. 5 is a section taken on line 5—5 of FIG. 3;

FIG. 8 is a view similar to FIG. 4; but showing a modification;

FIG. 9 is a view similar to FIG. 4, but showing a modification;

FIG. 10 is a view similar to FIG. 4, but showing a modification; and

FIG. 11 is a section taken on line 11—11 of FIG. 10.

DESCRIPTION OF A PREFERRED EMBODIMENT

Figure 6:
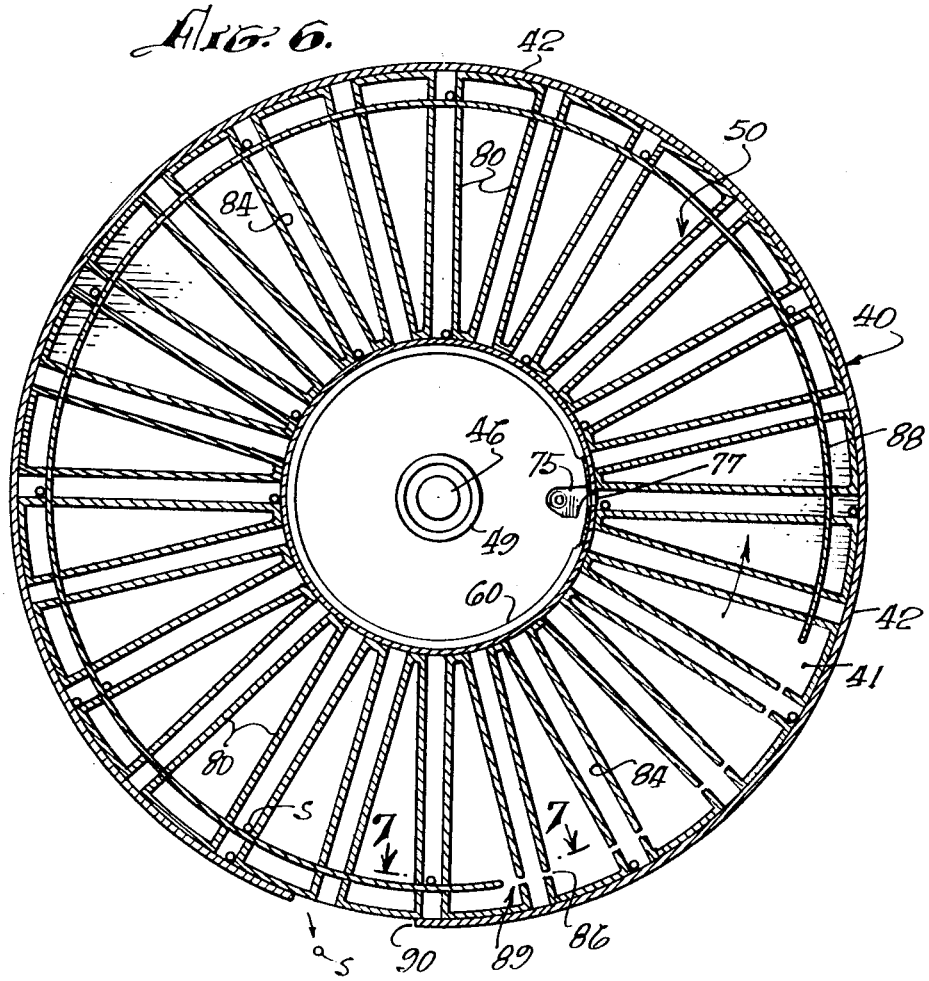
FIG. 6 is a section taken on line 6—6 of FIG. 2.
Figure 7:
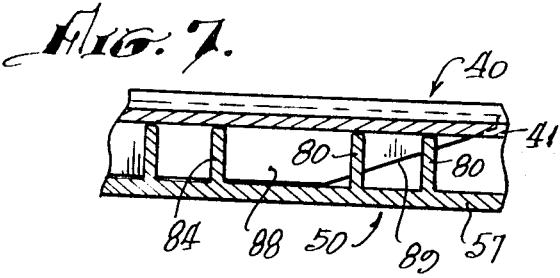
FIG. 7 is a section taken on line 7—7 of FIG. 6.

With reference first to FIG. 1, numeral 10 designates generally a conventional so-called tool bar at the trailing end of a towing tractor, not shown, and mounted on this tool bar 10 is a planter 12 in accordance with the present invention. The planter is further supported by a conventional trailing wheel 13, rotatable on an axle between parallel straps 14 extending rearwardly and somewhat downwardly from a pair of parallel side plate frame members 15 and 16. Extending upwardly from the forward ends of the plates 15 and 16 are risers or upward extension members 17, and the upper ends of these members are formed into a yoke 18 which joins them at the rear of a seed hopper 20. The mounting 22 by which the planter is connected to the tool bar 10 includes a pair of parallel side plates 23, and the plates 23 are notched to fit the tool bar 10 as shown, being firmly mounted to the latter by means of cap plates 24 engaging the opposite sides of the tool bar 10 and joined to the mounting structure by detachable fastening means, not shown. To the side plates 23 of this mounting structure are pivotally connected the front ends of two parallel links 25 and 26, which are in turn pivotally connected at their aft ends to upper and lower points on the riser or extension members 17. Thus it will be seen that the parts comprised of the wheel 13, and members 14, 15, 16, 17 and 18 may rise or fall relative to the tool bar 10, as trailing wheel 10 passes over humps and depressions in the ground. The planting machine is also equipped with a plow or furrow opener 29, and may have a conventional packer wheel, not shown, just in back of the wheel 13.

Also mounted on tool bar 10, to one side of the planter, and utilizing a mounting member 30 generally similar to the mounting member 22 described just above, is a framework 32 for a ground-engaging wheel 33, the latter being fixed to and turning a chain sprocket 34 connected by a chain 35 to a sprocket 36 on a horizontal transverse shaft 38 journalled in the mounting member 30, as indicated. The shaft 38 is thus rotated by the operation of running the wheel 33 over the ground, and this rotation of the shaft 38 drives a presently described rotating part of the planter 12.

Returning now to consideration of the planter 12, there is mounted between the two frame members 15 and 16 a generally circular frameplate 40. The plate 40 includes a circular vertical side flange 41 to which is joined a peripheral rim-flange 42 turned laterally at a somewhat acute angle, and extended at the top as at 44, to furnish a support for the seed hopper 20. The plate 40 further has a hub 45 which is mounted onto the aforementioned frameplate 16 FIG. 2). Projecting from hub 45 is an axle 46 on which is rotatably mounted, through bearings 47, the hub 49 of a rotatable seed distribution wheel 50. This wheel 50 runs at close clearance (substantially less than the smallest dimension of a seed) inside the peripheral flange 42 of the circular frameplate 40.

Wheel 50 is driven by a sprocket 52 on its hub and a chain 53 connecting this sprocket with a sprocket 39 on the aforementioned rotating shaft 38.

A shoulder 56 at the juncture of the flat ring part 57 of wheel 50 and the structure of the hub 49 seats a seed-metering ring 60 fastened tightly therein in any suitable manner. The ring 60 has a cylindrical rim-flange 62 (FIGS. 2, 4 and 5) into whose cylindric surface is sunk a plurality of equally spaced seed-receiving pockets or slots 64.

In their present preferred form, these pockets or slots 64 have portions 64a extending generally circumferentially around the inside of the rim-flange 62 and cut deeply into said flange, but not quite through it. To the rearward ends of these slot portions 64a, taken in relation to the direction of travel of the slots as the seed ring rotates, are joined laterally offset slot portions 64b. These slot portions 64b are cut entirely through the rim-flange so as to form seed ejection apertures 66 at the bottoms thereof. The slot portions 64a and 64b are designed so that several seeds can be received in the portions 64a, but only one seed at a time in the ejection portion 64b.

A circumferential groove 68 is sunk into the inner cylindric surface of the rim-flange 62 in a transverse plane of the axis of the wheel, so as to substantially medially intersect all of the offset seed ejection portions 64b of the slots 64, but spaced to one side of the filler or feed portions 64a thereof.

Seated on and fastened to a shoulder 70 inside the hub portion 45 of the circular frameplate 40 is a ring 72 having a circular cylindric flange 74 that closely surrounds, with small clearance relative to the size of a seed, the slotted seed ring-flange 62. Mounted on this ring 72, in a position half way between the top and the bottom and on the rearward side thereof, is a flat seed ejector finger or blade 75 that reaches into the groove 68, nearly to the bottom thereof, and is in a position to intercept successive seeds traveling in the offset slot portions 64b of successive slots 64. As these successive seeds engage the ejector 75, they are deflected radially outward (relative to the seed ring) with substantial force, and are thus ejected through an exit aperture 77 formed in the flange 74 immediately opposite the point of collision of the seed with the ejector.

Formed on the face of the flat ring portion 57 of wheel 50 are generally radial disposed ribs 80 reaching closely adjacent to the confronting face of the portion 41 of frameplate 40. These ribs 80, portions of members 41 and 57 between them, define generally radially disposed seed channels 84, whose inner ends receive seeds kicked out through stationary aperture 77 by ejection blade 75.

Insofar as the present invention goes, the seeds may be discharged from the radially outer ends of the channels 84 to the seed furrows in any suitable manner, but I here show a present preferred arrangement somewhat similar, at least in function, to that disclosed in the aforementioned U.S. Pat. No. 2,783,918. Thus, as 121 here shown, the ribs 80 and intervening channels 84 are formed, near their radially outer ends, with a narrow gap 86 which is occupied by a cylindric band 88 mounted on the stationary ringplate 41, so as to block the channels 84 against seed passage, excepting for an arcuate seed discharge gap 89 extending from approximately bottom center rearwardly for a suitable distance, e.g. something of the order of 50° (FIG. 6). As also appears in FIG. 6, the rim or rim-flange 42 of the circular plate member 41 is apertured or cut away to form a gap 90 at the bottom through which the seeds are finally dropped into the furrow, all as will presently be explained more fully.

A side wall structure 91 between hopper 20 and hub 45 encloses a chute 91a which conveys seeds from the hopper to and into an aperture 92 leading to an interior chamber 93 in the hub 45. The chamber 93 is defined on one side by an elastic diaphragm 95, preferably composed of a rubberized fabric which is stretched across the ring 72 and held taut thereby. Seed is discharged from chamber 93 through an aperture 95a in the bottom of diaphragm 95 into seed ring 60, and the diaphragm aperture 95a is so located that the seed then fills in over the slotted seed ring flange 64 to a depth of an inch or so.

A diaphragm vibrator 96 is provided in the form of a preferably resilient wire arm mounted on the hub structure of the wheel 50. This arm, which is shaped so as to somewhat deflect and locally stretch the diaphragm, rotates with the wheel 50, and thus runs about the diaphragm while depressing it. The diaphragm is thus maintained in vibratory motion, and prevents the seed filled in there adjacent from bridging and hanging up.

Mounted on the frame members 15 and 16 is a plow or furrow opener 100, which can be of any conventional form. This plow member has two sides 101 which form a V-section toward the front to act as a blade, but which are separated at the bottom of the wheel, as at 102 (FIG. 2), to permit dropping of seed therethrough.

A conventional packer wheel, not shown, is preferably used between the plow 100 and the trailing wheel 13, but forms no part of the invention and therefore need not be illustrated. A spring means, not shown, may be used in a conventional manner to hold or press the planter wheel 13 down against the soil; or, in lieu of a spring, the weight of the machine can be made adequate to accomplish this purpose.

Attention is called to the fact that the planter rises and falls by vertical swinging movement of the parallel links 25 and 26 as the trailing wheel passes over rises and depressions in the soil. This swing action takes place by swinging action of the links 25 and 26 relative to tractor mounting 22. The belt 53 connecting the wheel sprocket 52 with the driving sprocket 39 on shaft 38 does not materially lengthen and shorten owing to this motion, because the shaft 38 is journalled in the fixed mounting structure 22 to which the links 25 and 26 are pivotally connected, and the parts thus all swing up and down together on closely similar arcs.

Operation is as follows: Seed is loaded into the hopper and descends through chute 91a and aperture 92 to the space 93 bounded by the diaphragm 95, and aided by the vibrator or agitator 96, passes through the diaphragm aperture 95a and fills in above the slotted seed ring-flange 62 to a level just a little above the top of the aperture 95a. Seeds in abundant quantity thus overlie the slotted seed ring-flange 62, but the fill-in is not so great as to cause problems from overpacking. The seeds s thus fill in the seed slots 64, both the circumferential portion 64a thereof and the laterally offset portion 64b thereof that is intersected by the groove 68 and the blade. The slot portion 64b where it intersects the groove 68, and which has the open bottom at 66, is so dimensional that it can accept only one seed at a time, whereas several seeds may occupy trailing positions in the remainder of the slot. Since the offset portion of the slot is at the trailing end thereof, as the seed ring rotates, the seeds tend to move toward and into these offset portions, giving assurance that there will always be a seed in each slot in line with the groove 68 and the ejector blade 75 projecting into the latter.

FIG. 3 3 shows the seed ring in a position with a seed s in the offset, trailing end portions of a slot 64, and aligned with the bottom opening 66 of the slot, as well as with the exit aperture 77 in the ring-flange 77. The seed s is just on the point of collision with an angular edge portion 77a of the ejector blade 75 reaching into the slot 68; and upon such collision, the seed, which has some inherent elasticity, will be deflected in a direction radially of the seed ring so as to pass quickly through opening 66 and exit aperture 77.

The seed thereupon enters the radially inner end of a seed channel 84. It is first carried around in a circular path, riding on the outside of the flange 72, as shown in FIG. 6, until the seed channel begins to tilt downwardly in a radially outward direction. The seed then runs out along the channel until caught by the flange or band 88. This band 88 terminates in a gap 89 so that the seed, influenced both by gravity and centrifugal force, drops immediately to the outer extremity of the seed channel. Arrangements could be made for final discharge of the seed at this point. To assure that the seeds will actually be distributed at the exactly desired spacing interval, even when the planter is traveling slowly and centrifugal force is low, I prefer the following arrangement, shown basically in U.S. Pat. No. 2,783,918. The seed, instead of dropping immediately out, is caught by rim-flange 42 and thus makes an additional turn of the wheel, in engagement with flange 42, and propelled by the channel defining flange 84 behind it. Finally, the gap is encountered near or slightly ahead of the bottom center, and the seed s is finally discharged through this gap 90.

It is only possible for one seed at a time to be ejected by the feeding device, and there are no parts capable of breaking seeds. The planter operates at a relatively high speed and still with assurance of one seed deposited properly for each spacing interval.

Reference is next directed to FIGS. 8 and 9, showing two minor modifications wherein the feed slots of the seed rings are of modified shape. In FIG. 8, the slot here designated as 64' is straight and diagonal to the ejector groove 68. The rearward end portion of the groove 64' terminates in an open bottomed aperture 110 bisected by the ejector blade groove 68. The seed slot thus differs from the dog-leg type of slot of FIG. 4 in physical shape, but resembles it to the extent that it has a forward portion adapted to fill with seeds, and which is not intersected by the ejector blade groove 68, and a portion laterally offset from this first mentioned portion which is bisected by the blade groove 68. Accordingly, the blade working in the groove 68 will intersect and pick out a seed in a rearward end portion of the slot, aligned with the groove 68, but only the seed in this rearward end portion of the slot will be engaged by the blade.

FIG. 9 shows a curved blade slot 64" which is simply a variant of the embodiment of FIG. 8, with no patentable distinctions therebetween.

FIG. 10 is a view similar to FIG. 4, but showing a modification wherein the ring 70, in addition to the bottom flange 74, carries a top flange 116 closely overlying the seed ring-flange 62. This flange 116 has the effect of confining relatively elongated seeds so that they will drop into the offset slot portion 64b in line with the blade groove 68, and thus not having any tendency to bridge across the slot portion 64b, or climb out of the latter.

It will be understood that the drawings and description are merely illustrative of a present preferred embodiment of the invention, and that various changes in design, structure and arrangement may be made without departing from the spirit and scope of the appended claims.

I claim:

1. In a seed planter, the combination of:
a rotatable seed metering ring embodying a generally cylindrical rim having interior and exterior surfaces of revolution;
seed receiving pockets located at a predetermined spacing interval around the interior surface of said rim, said pockets being provided with apertures extending radially through the thickness of the rim; and
a single, stationary ejector element fixedly located in a position which intersects said pockets as said ring is rotated, so that the seeds therein engage said element and are deflected out through the open bottoms of the pockets.

2. The seed planter according to claim 1 including also:
a stationary circular wall closely encasing said exterior surface of revolution of said ring within the area of the open bottoms of said pockets, and there being a seed exit aperture in said wall directly in line with the seed-engaging portion of said fixed seed ejector element.

3. The seed planter according to claim 1 wherein the interior surface of revolution of said rim has a groove extending therearound which intersects said pockets; and
said ejector element extends into said groove at all times to be intercepted by the seeds occupying said pockets.

4. The seed planter according to claim 1; wherein the seed receiving pockets are elongate and include a first portion provided with said radially extending aperture and located in the path of interception of said ejector element and a second portion extending laterally of the first portion and out of said path of interception;
the second portion comprising a recess in the inner surface of the rim extending only partially through its thickness and adapted to hold a plurality of seeds.

5. In a seed planter, the combination of:
a frame means;
a frameplate mounted on said frame means in a non-horizontal position;
said frameplate having a radially outer annular disk section and a central hollow hub section dished out from the plane of the disk section;
a seed distributor wheel mounted for rotation adjacent to said frameplate on the opposite side of said disk section from said hub section, said wheel having a hollow hub portion;
a seed metering ring mounted inside said hub portion and fixed thereto;
a flexible diaphragm stretched across the central portion of the disk section of said frameplate, there being a seed feeding channel between the hub section of said frameplate and said diaphragm, and there being a seed passing aperture in the lower portion of said diaphragm for discharging seed over the inside surface of the lowermost portion of said seed metering ring, there being spaced seed-receiving pockets formed in a radially inner surface of said seed metering ring, with at least portions of said pockets opening radially outward through said ring; and fixed ejector means for engaging seeds in said pockets and deflecting them through the outward openings thereof.

6. The subject matter of claim 5, including means on said wheel engaging and flexing said diaphragm to promote flow of seed therepast.

7. In a seed planter, the combination of:
a seed distributor wheel mounted for rotation on a transverse axis;
a rotatable seed metering ring arranged to supply seeds to said seed distributor wheel;
a seed feeding channel located laterally of said metering ring;
a flexible diaphragm located between the seed feeding channel and the metering ring and provided with a seed passing aperture in its lower portion to discharge seed on the lowermost portion of the metering ring; and
means on said distributor wheel rotatable therewith and engaging and flexing said diaphragm to promote flow of seed therepast.

8. Seed planting apparatus comprising:
a seed planting wheel having a hub mounted for rotation on a transverse axle in a predetermined direction;
an annular seed compartment surrounding the axle;
means to supply a quantity of seeds to the lower part of the seed compartment;
a stationary cylindrical seed retainer ring surrounding the seed compartment;
a seed exit aperture extending radially through the thickness of the retainer ring at a point angularly forward of the bottom of the retainer ring, in the direction of rotation of the wheel, and well above the bottom of the retainer ring;
the wheel including a plurality of channels connected to the hub for rotation therewith and extending radially from the retainer ring to the circumference of the wheel and open at their inner and outer ends to register with and receive seeds from the exit aperture, transport them to the outer ends, and deposit them on the ground;
a seed pickup ring including a cylindrical rim also connected to the hub for rotation therewith and sized to fit just within the retainer ring;

the inner surface of the rim being provided around its circumference with a plurality of seed pockets provided with apertures extending radially through the thickness of the rim to pick up seeds as the rim passes through the lower portion of the seed compartment; and ejector means located inwardly adjacent to the exit aperture and in the path of travel of the seed pockets to intercept the seeds as the pockets register with the exit aperture and deflect them through the bottoms of the pockets, through the exit aperture, and into the momentarily registered inner end of the associated channel.

9. Apparatus as claimed in claim 8;

a groove formed around the circumference of the inner surface of the rim; and the ejector means projecting at all times into the groove to contact the successive seeds in their pockets.

10. Apparatus as claimed in claim 8;

and stationary circumferential shield means surrounding substantially the entire circumference of the wheel and overlying the outer ends of the channels to retain the seeds in the channels;

the shield means being cut away throughout a predetermined limited sector of its lower portion to sequentially uncover the outer ends of the channels and permit the seeds to be sequentially dropped by gravity at spaced loci along the ground.

* * * * *